(12) United States Patent
Linden et al.

(10) Patent No.: US 10,711,503 B2
(45) Date of Patent: Jul. 14, 2020

(54) DOOR PRESENTER, CINCH AND EDGE GUARD ACTUATOR

(71) Applicant: Ford Global Technologies, LLC, Dearborn, MI (US)

(72) Inventors: Howard Paul Tsvi Linden, Southfield, MI (US); Onoyom Essien Ekanem, White Lake, MI (US); David Darius Wooten, Redford, MI (US); Cornel Gardner, Romulus, MI (US); Kosta Papanikolaou, Huntington Woods, MI (US); Paul L. Heirtzler, Jr., Northville, MI (US)

(73) Assignee: Ford Global Technologies, LLC, Farmington, CT (US)

( * ) Notice: Subject to any disclaimer, the term of this patent is extended or adjusted under 35 U.S.C. 154(b) by 174 days.

(21) Appl. No.: 15/813,499

(22) Filed: Nov. 15, 2017

(65) Prior Publication Data

US 2019/0143796 A1    May 16, 2019

(51) Int. Cl.
*E05F 15/619* (2015.01)
*B60R 13/04* (2006.01)
*E05F 15/00* (2015.01)

(52) U.S. Cl.
CPC .......... *E05F 15/619* (2015.01); *B60R 13/043* (2013.01); *E05F 15/00* (2013.01); *E05Y 2900/531* (2013.01)

(58) Field of Classification Search
CPC ......... E05F 15/00; E05F 15/619; E05F 15/63; E05F 15/611; B60R 13/043
See application file for complete search history.

(56) References Cited

U.S. PATENT DOCUMENTS

| | | | | |
|---|---|---|---|---|
| 2,678,232 A | * | 5/1954 | Barry | B60R 13/043 49/462 |
| 3,243,222 A | * | 3/1966 | Loughary | B60R 13/043 49/460 |
| 3,398,484 A | * | 8/1968 | Katsumura | E05F 15/611 49/138 |
| 3,473,264 A | * | 10/1969 | Holka | B60R 13/043 49/462 |

(Continued)

FOREIGN PATENT DOCUMENTS

| | | |
|---|---|---|
| DE | 102006053275 A1 | 5/2008 |
| DE | 202008005885 U1 | 10/2009 |
| WO | 2011/146967 A1 | 12/2011 |

OTHER PUBLICATIONS

Ford develops flap to help prevent door damage, SAE International, Oct. 25, 2011, http://articles.sae.org/10342/.

*Primary Examiner* — Justin B Rephann
(74) *Attorney, Agent, or Firm* — Michael Fridman; Carlson, Gaskey & Olds, P.C.

(57) ABSTRACT

A vehicle door system includes a closer operable to move a door to a closed position. A presenter is operable to move the door to an initial open position. An actuator is mounted within the door and includes a linear moving member movable between a retracted and extended position along a linear axis. The linear moving member operates the presenter when moved toward the extended position and the closer when moved toward the retracted position. The actuator may also be utilized to drive a door edge protector.

15 Claims, 7 Drawing Sheets

(56) References Cited

U.S. PATENT DOCUMENTS

| | | | | |
|---|---|---|---|---|
| 3,653,154 | A * | 4/1972 | Hayday | E05F 15/619 49/280 |
| 4,458,446 | A * | 7/1984 | Mochida | B60K 28/00 49/28 |
| 4,644,693 | A * | 2/1987 | Wang | E05F 15/619 49/280 |
| 4,839,991 | A * | 6/1989 | Rathgeb | B60R 13/043 49/462 |
| 7,360,339 | B1 * | 4/2008 | Jooste | B60R 13/043 296/152 |
| 8,234,817 | B2 * | 8/2012 | Neundorf | E05B 81/20 49/28 |
| 8,303,021 | B2 * | 11/2012 | Lichter | B60R 13/043 293/118 |
| 9,174,517 | B2 * | 11/2015 | Scheuring | B60J 5/047 |
| 9,322,204 | B2 * | 4/2016 | Suzuki | E05F 15/611 |
| 9,605,469 | B2 | 3/2017 | Henseleit et al. | |
| 9,650,826 | B2 * | 5/2017 | Potter | E05F 15/614 |
| 2004/0256881 | A1 * | 12/2004 | Takeda | E05F 15/63 296/146.2 |
| 2006/0053916 | A1 * | 3/2006 | Tanaka | E05F 15/619 74/422 |
| 2007/0175099 | A1 * | 8/2007 | Kachouh | E05F 15/611 49/340 |
| 2011/0266080 | A1 * | 11/2011 | Schmitt | E05C 17/006 180/89.1 |
| 2015/0291116 | A1 | 10/2015 | Pi | |
| 2017/0089103 | A1 | 3/2017 | Ottino et al. | |
| 2017/0144516 | A1 | 5/2017 | Iacovoni et al. | |
| 2019/0024421 | A1 * | 1/2019 | Cumbo | B60Q 1/2669 |
| 2019/0112859 | A1 * | 4/2019 | Cumbo | E05F 15/619 |

* cited by examiner

DOOR PRESENTER, CINCH AND EDGE GUARD ACTUATOR

TECHNICAL FIELD

This disclosure relates to an actuator driving a vehicle door presenter, a cinch mechanism and a guard mechanism.

BACKGROUND

Vehicle doors include a powered latch to secure the door in a closed position. The powered latch includes an electric actuator that is operable by switches within the passenger compartment. Vehicle doors may also include other powered mechanisms that ease door operation and effort required by a passenger. Doors may include a presenter mechanism that opens the door a predetermined amount when actuated. The door may also include a closing or cinch mechanism that draws the door to the complete closed position for the operator. Moreover, some doors may include protection devices that protect edges of the door. Each feature and door mechanism requires an actuator. Multiple mechanisms and actuators installed within the limited space available within the vehicle door complicate assembly and control functions.

SUMMARY

A vehicle door system according to an exemplary aspect of the present disclosure includes, among other things, a closer operable to move a door to a closed position. A presenter is operable to move the door to an initial open position. An actuator is mounted within the door and includes a linear moving member movable between a retracted and extended position along a linear axis. The linear moving member operates the presenter when moved toward the extended position and the closer when moved toward the retracted position.

In a further non-limiting embodiment of the foregoing vehicle door system, the linear movable member includes a linear drive gear and the closer includes a closer gear engageable with the linear drive gear.

In a further non-limiting embodiment of any of the foregoing vehicle door systems, the presenter includes a presenter gear engageable with the linear drive gear.

In a further non-limiting embodiment of any of the foregoing vehicle door systems, an edge protector movable between a stowed position and a deployed position. The edge protector includes a protector gear engageable with the linear drive gear.

In a further non-limiting embodiment of any of the foregoing vehicle door systems, the closer gear, the presenter gear and the protector gear are all disposed along the linear axis for engagement with the linear drive gear.

In a further non-limiting embodiment of any of the foregoing vehicle door systems, a closer actuator for selectively coupling the closer gear to the closer. The closer actuator decouples the closer gear from the closer when extending the linear drive gear.

In a further non-limiting embodiment of any of the foregoing vehicle door systems, a closer link is driven by the closer gear. The closer link converts rotation of the closer gear into linear movement.

In a further non-limiting embodiment of any of the foregoing vehicle door systems, a presenter actuator for selectively coupling the presenter gear to the presenter. The presenter actuator decouples the presenter gear from the presenter when retracting the liner drive gear.

In a further non-limiting embodiment of any of the foregoing vehicle door systems, a presenter link is driven by the presenter gear. The presenter link converts rotation of the presenter gear into linear movement.

In a further non-limiting embodiment of any of the foregoing vehicle door systems, the actuator includes a lead screw that drives the linear moving member along the axis.

A method of operating a vehicle door system according to an exemplary aspect of the present disclosure includes, among other things, driving a linear drive gear along a linear axis from a retracted position to an extended position. A presenter gear with linear drive gear is engaged to move a presenter toward an initial open position. A protector gear disposed along the linear axis after engagement with the presenter gear is engaged to move an edge protector to a deployed position.

In a further non-limiting embodiment of the foregoing method, decoupling the presenter gear from the linear drive gear and driving the linear drive gear from the extended position toward the retracted position and moving the protector from the deployed position to a stowed position responsive to movement of the linear drive gear toward the retracted position.

In a further non-limiting embodiment of any of the foregoing methods, coupling a closer gear to the linear drive gear during movement toward the retracted position to drive the closer to move the door to a closed position.

In a further non-limiting embodiment of any of the foregoing methods, driving a ball screw with the actuator to move the linear drive gear between the retracted and extended positions.

In a further non-limiting embodiment of any of the foregoing methods, selectively actuating a presenter actuator to decouple the presenter gear from the presenter and actuating a closer actuator to selectively couple the closer gear with the closer.

The various features and advantages of this disclosure will become apparent to those skilled in the art from the following detailed description. The drawings that accompany the detailed description can be briefly described as follows.

DETAILED DESCRIPTION

Figure 1:
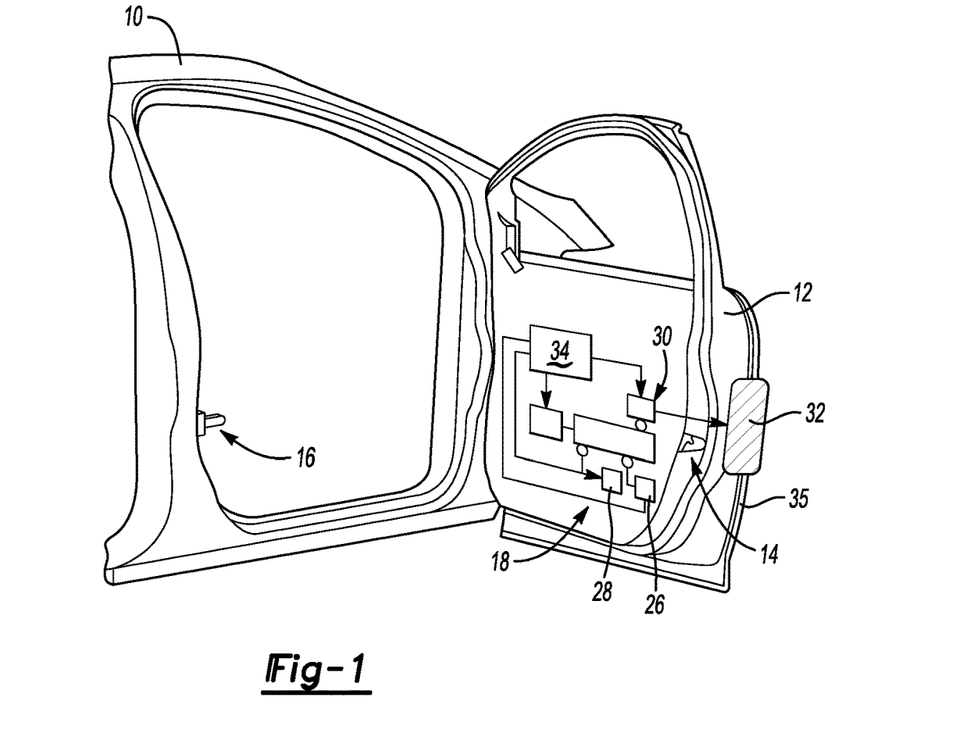
FIG. 1 is a schematic view of an example door system.

Referring to FIG. 1, a portion of a vehicle 10 is shown schematically and includes a door 12 with a latch 14 that couples to a fixed catch 16. The door 12 includes a door system 18 that includes features in addition to the latching and window mechanisms. In this example, the door system 18 includes a presenter system 26, a closer system 28 and an edge protector system 30. The presenter system 26 is provided to move the door 12 to an initial open position to aid in ingress and egress from the motor vehicle. The closer system 28 moves the door to a final closed position by pulling the door 12 to the desired closed and latched position. The door edge protector 30 includes a protector 32 that is deployed when the door 12 is opened to prevent damaging contact or impact with edges 35 of the door 12. The protector 32 is an element that extends from the door 12 to protect the edge of the door. The protector 32 can be of any suitable shape and size that corresponds with the edge and structure of the door 12.

Figure 2:
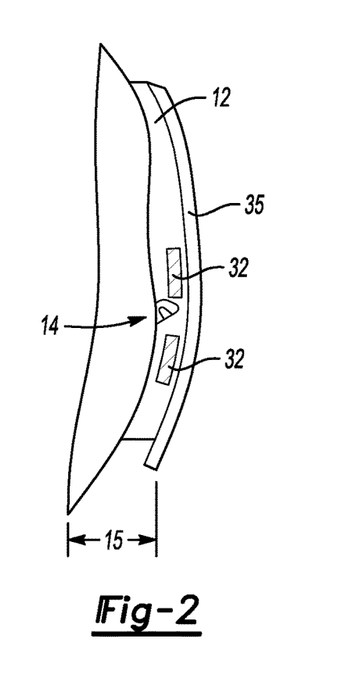
FIG. 2 is a side view of an example door in an initial ajar position.

Referring to FIG. 2 with continued reference to FIG. 1, the door 12 is shown in an initial ajar position, a distance 15 from the closed position. In this position, the edge protectors 32 are retracted and the latch 14 is initially unlatched allowing the door to be freely moved toward an open position. The position illustrated in FIG. 2 is the initial open position that is provided by actuation of the presenter 26.

Figure 3:
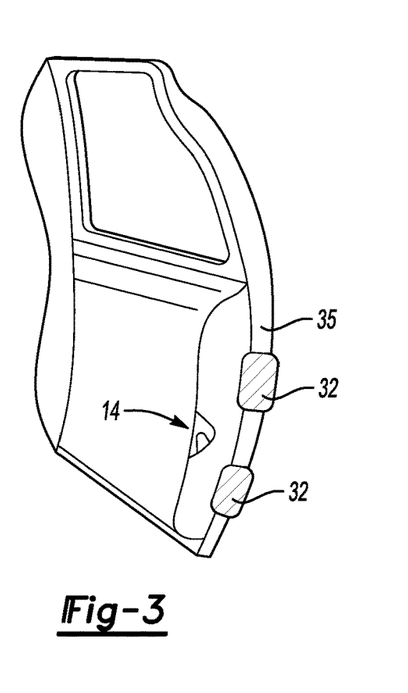
FIG. 3 is the example door in an open position.

Referring to FIG. 3 with continued reference to FIGS. 1 and 2, the door 12 is shown in a more open position where the protectors 32 are deployed to the edge of the door and the latch 14 is fully disengaged. This position includes the edge protector 32 moved outward to protect edges 35 of the door 12 from impact against surrounding vehicles or objects.

Figure 4:
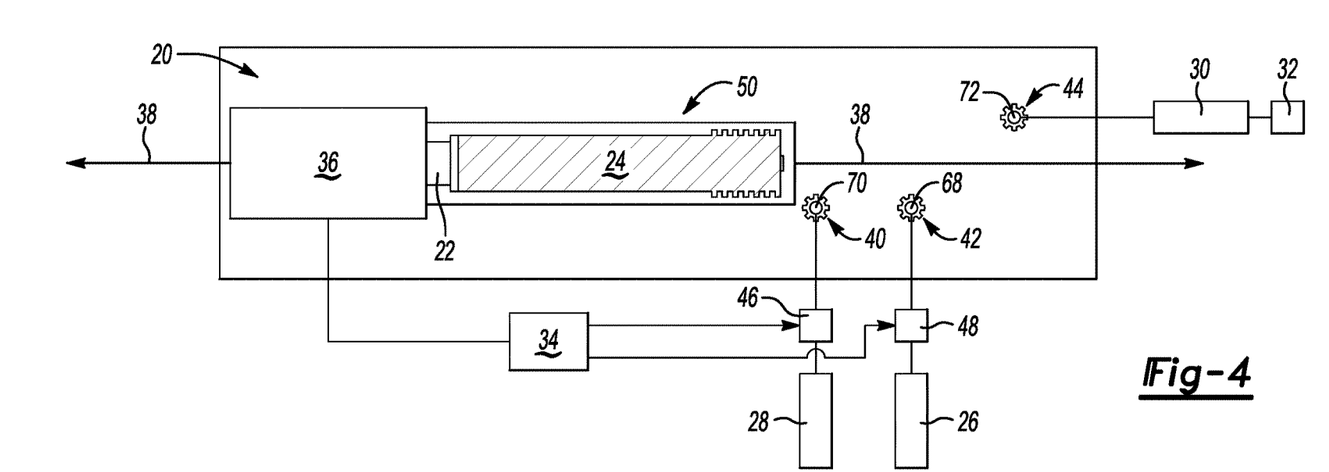
FIG. 4 is a schematic representation of an example door system embodiment.

Referring to FIG. 4 with continued reference to FIG. 1, the example door system 18 is schematically shown and includes an actuator 20 that engages and operates the presenter 26, the closer 28 and the edge protector 30. The example actuator 20 has a motor 36 that drives a ball screw 22 that in turn drives a linear drive gear 24. The linear drive gear 24 is a rack gear and moves along an axis 38.

The linear drive gear 24 moves between a retracted position 50 as is illustrated in FIG. 4 and an extended position 52 (FIG. 7) along the axis 38 to engage and actuate each of the presenter 26, closer 28 and edge protector 30 depending on a position of the door 12. When the door 12 is in an initial closed position and is moved toward an open position, the presenter 26 may be activated. When the door is in an open position and moved toward the closed position, the closer 28 may be activated.

The same common actuator 20 is utilized to actuate each of the presenter 26, closer 28 and edge protector 30 mechanisms of the door system 18. In this way, only one actuator is required to drive all systems. The use of one actuator 20 for all of the systems 26, 28 and 30 simplifies assembly, operation and control functions.

The presenter 26 and closer 28 include a closer gear 40 and a presenter gear 42 respectively that are disposed about respective axes 70 and 68. The closer gear 40 and the presenter gear 42 are positioned in a manner that they will engage the linear drive gear 24 as it extends outward from the retracted position 50 along the axis 38. A protector gear 44 is also provided and engages the linear drive gear 24 as it is further extended from the retracted position.

When the door is being opened, the closer 28 is not required and therefore the closer gear 40 is retracted away from a position that will engage the linear drive gear 24. A closer actuator 46 is provided to move the gear 40 such that the axis 70 is positioned to move the closer gear 40 away from a position that will engage the rack gear 24. A controller 34 is utilized to control the closer actuator 46 and the actuator 20. The controller 34 is also in communication with a presenter actuator 48 that is provided to selectively couple the presenter gear 42 from a location that will engage the linear drive gear 24. The closer actuator 46 and the presenter actuator 48 are shown schematically and may include a solenoid, mechanism, clutch or other mechanism that provides for decoupling of the corresponding closer gear 40 and presenter gear 42.

Figure 5:
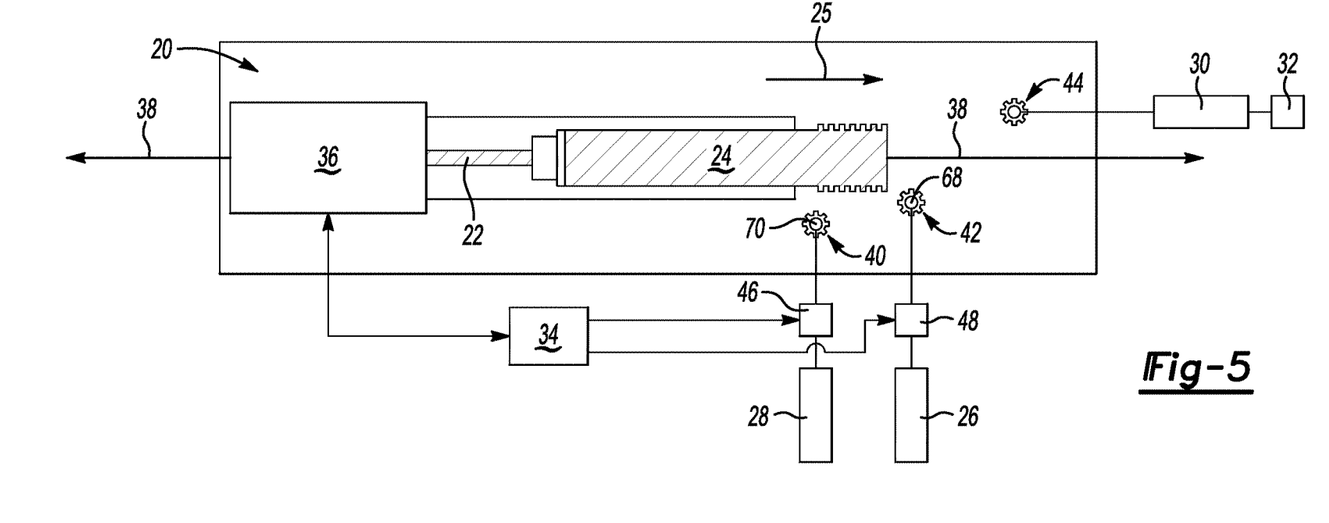
FIG. 5 is another example schematic view of the example door system during an initial movement from a retracted position.

Referring to FIG. 5, the actuator 20 is shown as it is moving the linear drive gear 24 away from the retracted position towards a position that will begin to engage the closer 28, presenter 26 and edge protector 30. In the position illustrated in FIG. 5, the actuator 20 is initially being actuated to open the door 12. Accordingly, the closer actuator 46 is actuated to move the closer gear 40 away from a position that will engage the linear drive gear 24. The closer actuator 46 may be any actuator, solenoid or mechanism utilized to move the gear 40 away from a position that will engage the linear drive gear 24. The presenter actuator 48 is actuated and/or left in a position that maintains the position of the presenter gear 48 for rotation about an axis 68 that will cause engagement between the linear drive gear 24 and the presenter gear 68.

Figure 6:
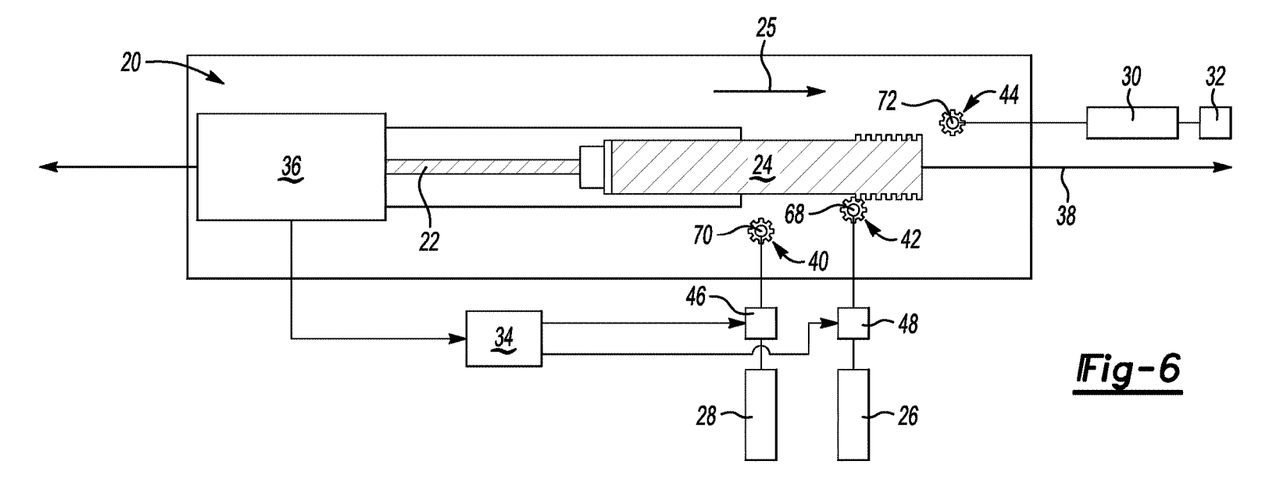
FIG. 6 is another schematic view of the example door system in a position engaging an example presenter.

Referring to FIG. 6, the linear drive gear 24 is shown in a position engaging and driving the presenter gear 42. The linear drive gear 24 has passed over the closer gear 40 and not engaged the closer 28 because the closer actuator 46 has moved the closer gear 40 away from the position that would engage the linear drive gear 24.

Figure 7:
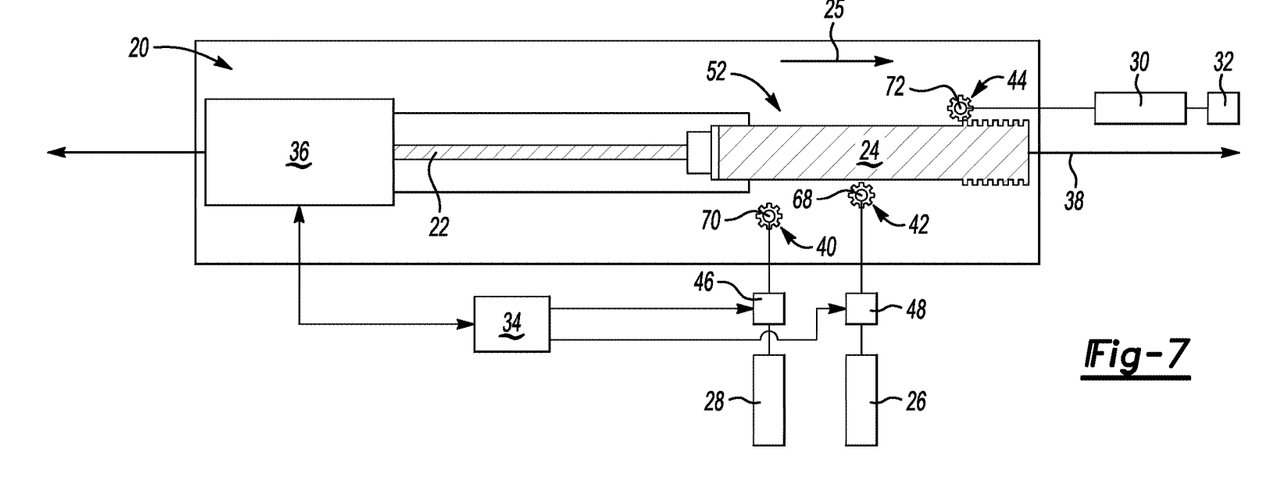
FIG. 7 is a schematic view of the example door system with an actuator in an extended position.

Referring to FIG. 7, further extension of the linear drive gear 24 moves past the presenter 68 and engages the edge protector gear 44. The edge protector gear 44 thereby drives the edge protector 30 to move the protectors 32 outwards to protect the edges 35 of the door 12 as is illustrated in FIGS. 2 and 3. The linear drive gear 24 is shown in a fully extended position 52 along the axis 38 in FIG. 7 such that the edge protectors 32 are in a fully extended position. The fully extended position illustrated in FIG. 7 corresponds with opening of the door a predefined amount that initiates actuation of the protector system 30.

Figure 8:
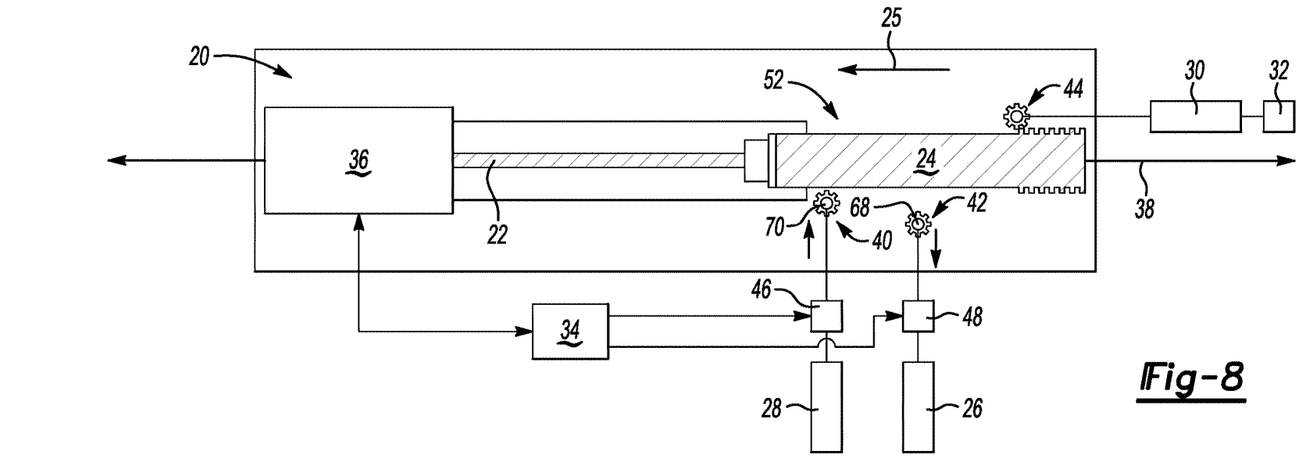
FIG. 8 is a schematic view of the example door system in a position moving towards a retracted position.

Referring to FIG. 8, upon closing of the door, the linear actuator 24 will begin movement towards the retracted position as indicated schematically by arrow 25. First movement from the extended position 52 to the retracted position 50 will drive the protector gear 44 in an opposite direction to withdraw the protector 30 and move the protectors 32 to the retracted position as is illustrated in FIG. 2.

Figure 9:
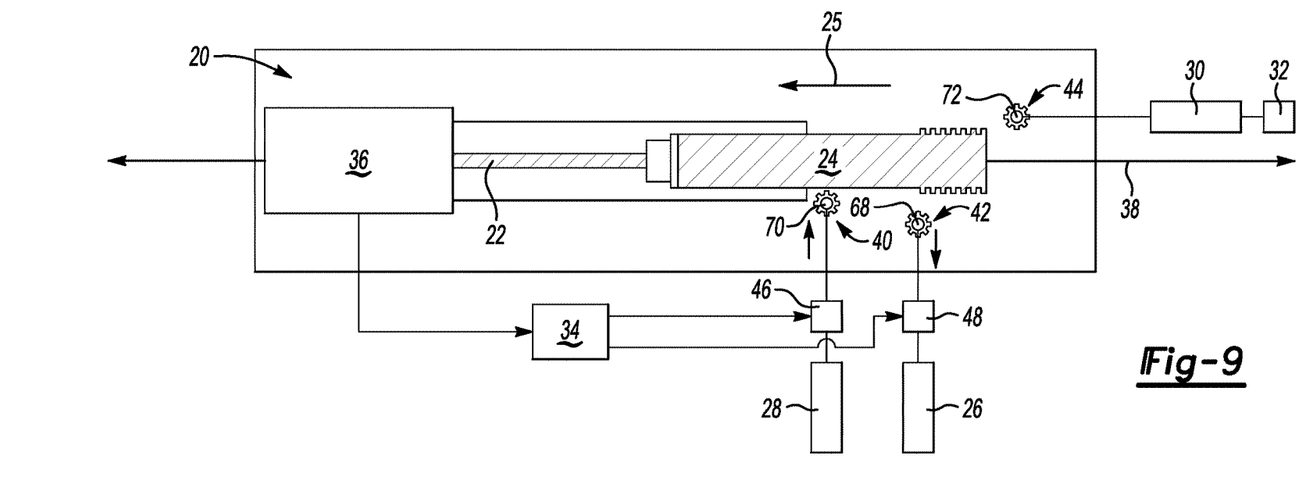
FIG. 9 is a schematic view of the example door system in a second position moving towards the retracted position.

Referring to FIG. 9, the example linear drive gear 24 is shown in a further position moving towards full retraction.

As appreciated, the presenter system 26 is not required when the door 12 is being moved to the closed position. Accordingly, the presenter actuator 48 has moved the presenter gear 42 away from a position that would cause engagement with the linear drive gear 24. Additionally, the closer actuator 46 has moved the closer gear 40 upward into a position for engagement with the linear drive gear 24.

Figure 10:
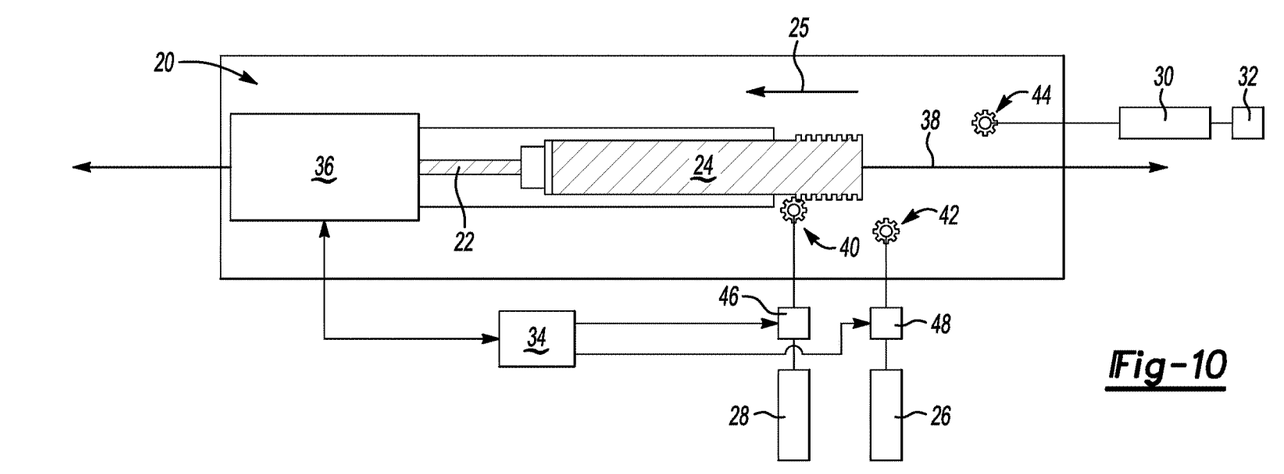
FIG. 10 is a schematic view of the door system actuating an example closer.

Referring to FIG. 10, the example linear drive gear 24 is engaging driving the closer gear 40 to drive the closer 28. The closer actuator 46 positions the closer gear 40 back to the position that engages the linear drive gear 24. Further movement of the linear drive gear 24 toward the retracted position drives the closer 28 to extend and retract to draw the vehicle door 12 to a final closed position.

Figure 11:
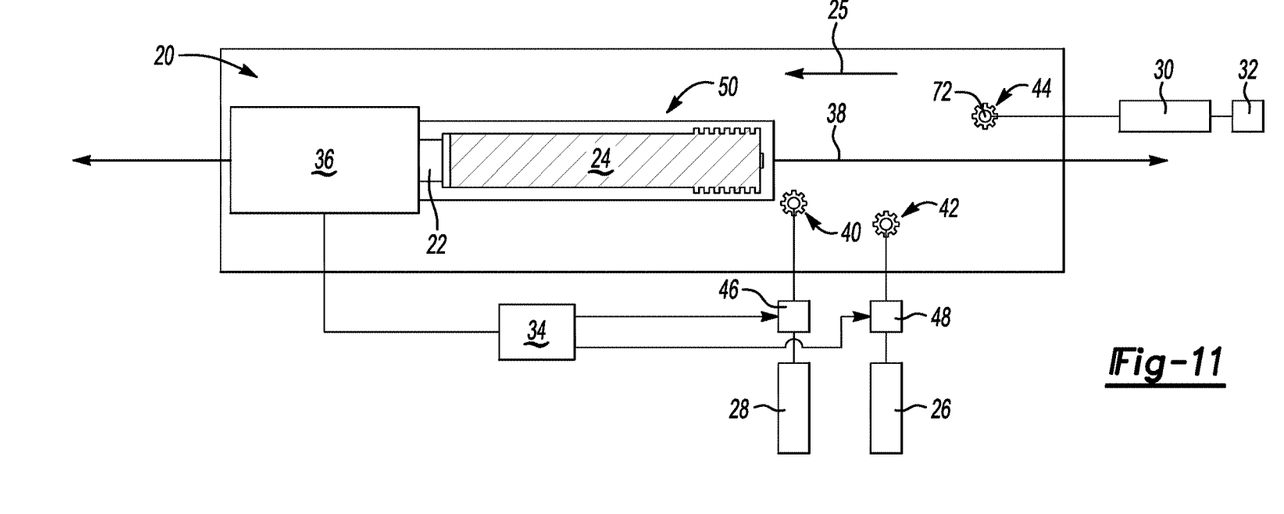
FIG. 11 is an example view of the door system in a retracted position.

Referring to FIG. 11, the example door system 18 is shown in the retracted position 50 with door 12 in a fully closed position. In the closed position, the edge protectors 32 are retracted and the door 12 is closed and latched.

Figure 12:
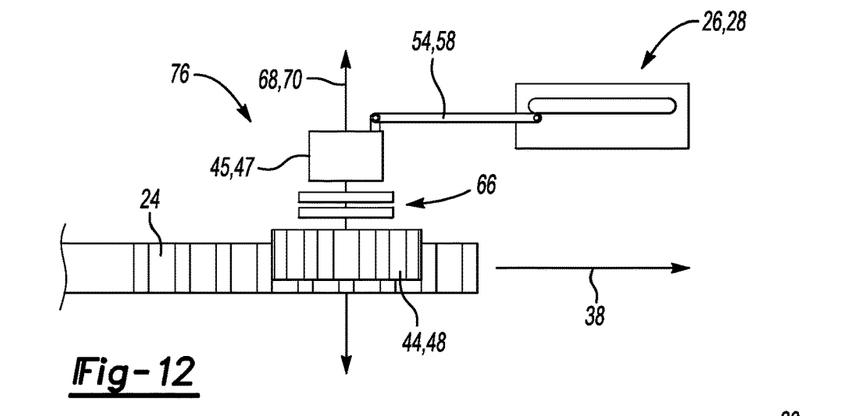
FIG. 12 is a schematic view of another decoupling embodiment of the door system.

Referring to FIG. 12, another example drive system 76 is schematically shown and includes an actuator 45, 47 for decoupling of the closer and presenter systems 26, 28 from the linear drive gear 24. The disclosed configuration is applicable to each of the closer and presenter 28, 26. In this example, a clutch 66 is disposed between the closer and presenter actuators 45, 47 such that the closer gear 40 and the presenter gear 48 do not need to be moved away from engagement with the linear drive gear 24. Instead, each of the closer gear 40 and presenter gear 48 are maintained about their respective axes of rotation 68 and 70 and decoupled from driving the corresponding closers 28 and presenter 26. Decoupling is provided by the clutch 66 driven by respective closer actuator and presenter actuators 45, 47. It should be understood that other decoupling mechanisms as are known may also be used and are within the contemplation of this disclosure.

Figure 13A:
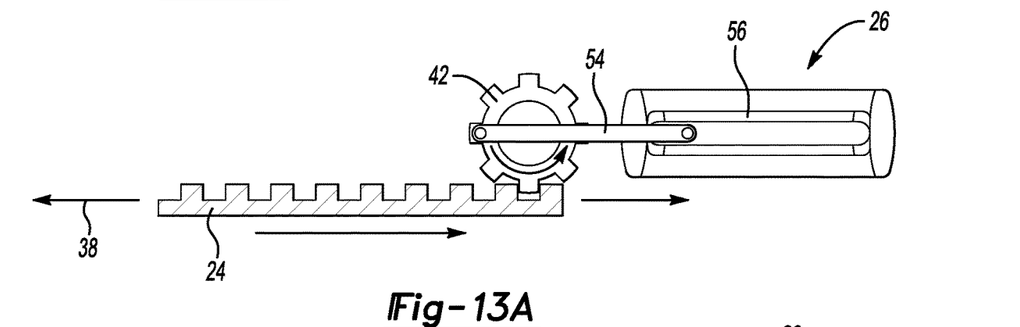
FIG. 13A is a schematic view of an example presenter in an initial position.
Figure 13B:
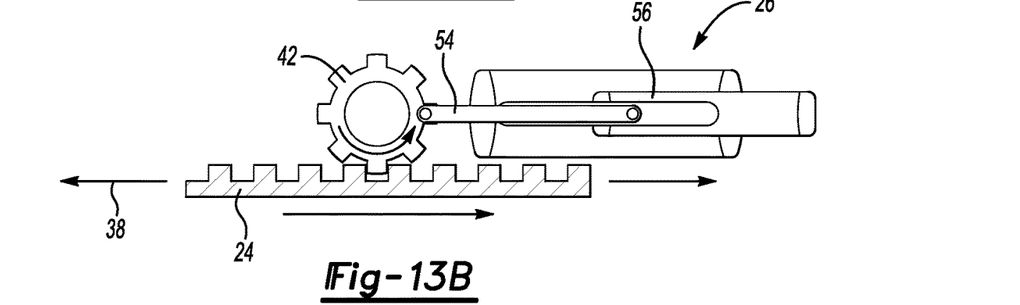
FIG. 13B is a schematic view of the example presenter in an extended position.
Figure 13C:
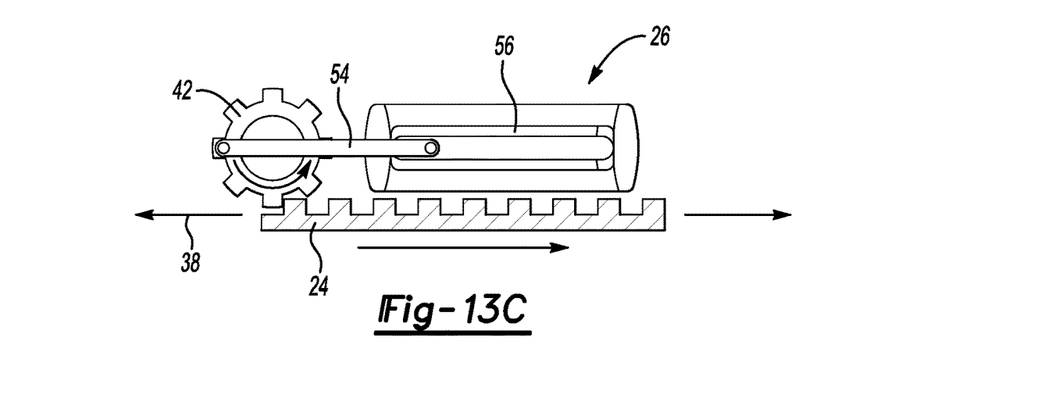
FIG. 13C is a schematic view of the example presenter in a retracted position.

Referring to FIGS. 13A-C, the presenter system 26 is schematically shown and includes the presenter gear 42 that is driven by the linear drive gear 24. Upon rotation of the presenter gear 42, a link 54 coupled to the drive gear 42 will move a linear finger 56. From an initial position illustrated in FIG. 13A, the drive gear 42 moves the link 54 such that the finger member 56 will move outward. The outward linear movement provided by the link 54 and finger 56 is utilized to move the door from the closed position to an initial open position illustrated in FIG. 2.

Further movement of the linear drive gear 24 in the same direction will result in further rotation of the presenter gear 42 that draws the link 54 back such that the finger 56 is moved from the extended position that moves the door to the initial open position to a retracted position. A schematic presenter system 26 is shown by way of example, other configurations of presenter systems are within the contemplation of this disclosure and would benefit from this disclosure.

Figure 14A:
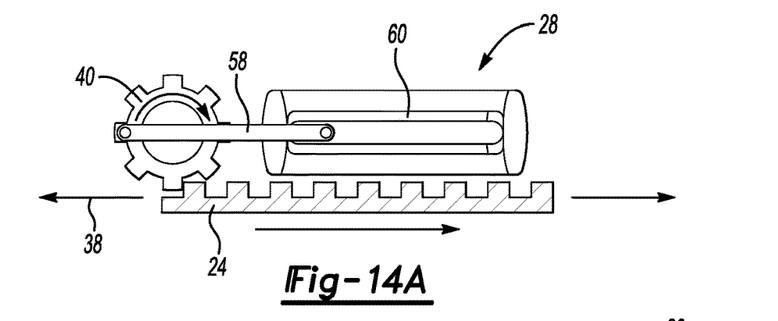
FIG. 14A is a schematic view of an example closer in an initial actuation position.
Figure 14B:
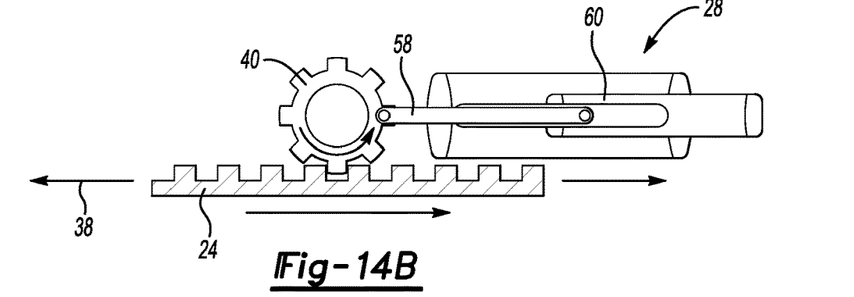
FIG. 14B is a schematic view of the example closer in an extended position.
Figure 14C:
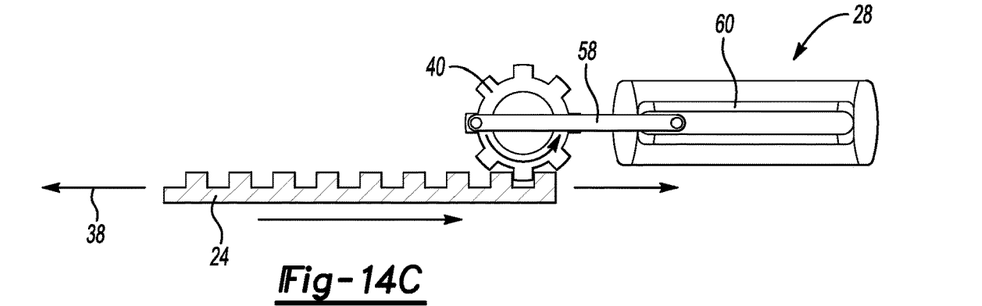
FIG. 14C is a schematic view of the closer in a retracted position.

Referring to FIGS. 14A-C, the closer system 28 is shown schematically and includes the closer gear 40 coupled to a closer link 58 that drives a closer hook 60. The hook 60 moves in a linear fashion to extend outward, grasp the catch 16 and pull the door 12 to a closed position. This movement is facilitated by extension of the hook 60 as is illustrated in FIG. 14B followed by retraction of the hook 60 caused by continued movement of the linear drive gear 24 in a direction indicated by the arrows in 14C. It should be appreciated, that the closer system 28 is shown schematically and that other configurations as would be understood by one skilled in the art are within the contemplation of this disclosure.

Figure 15:
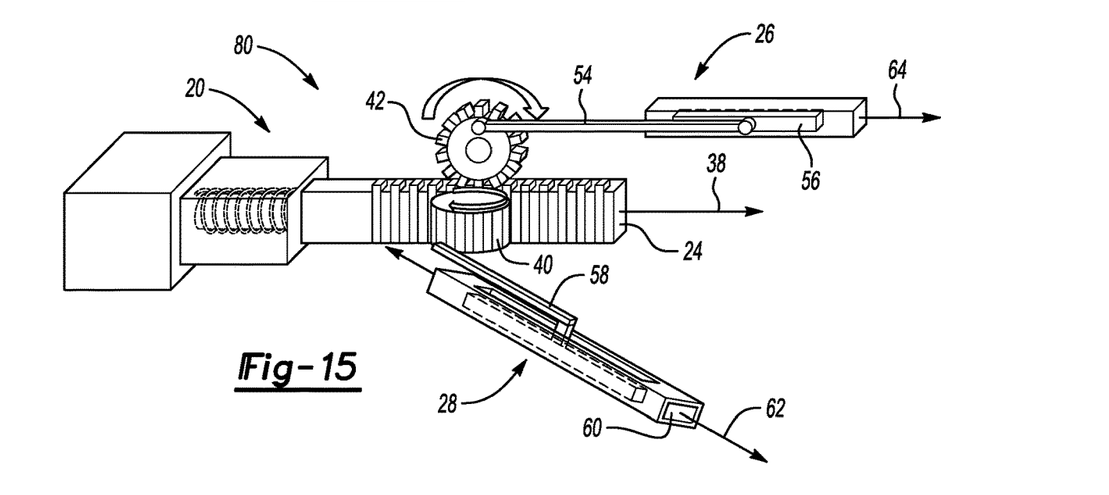
FIG. 15 is a schematic view of another embodiment of the example door system.

Referring to FIG. 15, an alternate drive system embodiment 80 is schematically illustrated and shows that the drive gear 24 is movable along the linear axis 38. However, the presenter 26 and the closer 28 need not be disposed along a common axis but may be spaced part and parallel to the linear axis 38 as is indicated by axis 64 of the presenter 26. Additionally, the linear members of the closer 28 such as the hook 60 could be provided movement along an axis 62 that is disposed at an angle relative to the linear axis 38 along which the linear drive gear 24 moves. Accordingly, the axes for movement of the closer 28 and the presenter 26 may be in different directions, spaced apart from the axis 38 and disposed at an angle relative the axis 38 to facilitate assembly and packaging within the vehicle door 12.

Accordingly, the example door system provides a single actuator for driving several different door systems rather than requiring multiple actuators that need to be controlled at different times. The example single actuator door system simplifies assembly and reduces the amount of space required within a door.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle door system comprising:
   a closer operable to move a door to a closed position, the closer including a closer gear;
   a presenter operable to move the door to an initial open position, the presenter including a presenter gear;
   an edge protector movable between a stowed position and a deployed position, the edge protector including a protector gear;
   an actuator mounted within the door and including a linear drive gear movable between a retracted position and an extended position along a linear axis, wherein the closer gear, the presenter gear and protector gear are engageable with the linear drive gear and the linear drive gear engages the presenter gear when operating the presenter when moved toward the extended position and the linear drive gear engages the closer gear when operating the closer when moved toward the retracted position.

2. The vehicle door system as recited in claim 1, wherein the closer gear, the presenter gear and the protector gear are all disposed along the linear axis for engagement with the linear drive gear.

3. The vehicle door system as recited in claim 1, including a closer actuator for selectively coupling the closer gear to the closer, wherein the closer actuator decouples the closer gear from the closer when extending the linear drive gear.

4. The vehicle door system as recited in claim 3, including a closer link driven by the closer gear, the closer link converting rotation of the closer gear into linear movement.

5. The vehicle door system as recited in claim 1, including a presenter actuator for selectively coupling the presenter gear to the presenter, wherein the presenter actuator decouples the presenter gear from the presenter when retracting the linear drive gear.

6. The vehicle door system as recited in claim 5, including a presenter link driven by the presenter gear, the presenter link converting rotation of the presenter gear into linear movement.

7. The vehicle door system as recited in claim 1, wherein the actuator includes a lead screw that drives the linear moving member along the axis.

8. A vehicle door system comprising:
   a linear drive gear disposed within a door, the linear drive gear movable between a retracted position and an extended position along a linear axis;
   a closer operable to move the door to a closed position, the closer including a closer actuator movable to selectively move a closer gear into engagement to the linear drive gear; and
   an edge protector movable between a stowed position and a deployed position, the edge protector including a protector gear engageable to the linear drive gear.

9. The vehicle door system as recited in claim 8, including a presenter operable to move the door to an initial open position, the presenter including a presenter actuator to selectively move a presenter gear into engagement to the linear drive gear.

10. The vehicle door system as recited in claim 9, including a presenter link driven by the presenter gear, the presenter link converting rotation of the presenter gear into linear movement.

11. The vehicle door system as recited in claim 9, wherein the presenter actuator is configured to move the presenter gear into engagement with the linear drive gear as the linear drive gear moves toward the extended position to operate the presenter to move the door to the initial open position and the closer actuator is configured to move the closer gear to a position that does not engage the linear drive gear as the linear drive gear moves toward the extended position.

12. The vehicle door system as recited in claim 9, wherein the closer actuator is configured to move the closer gear into engagement with the linear drive gear as the linear drive gear moves toward the retracted position to move the door to the closed position and the presenter actuator is configured to move the presenter gear to a position that does not engage the linear drive gear as the linear drive gear moves toward the retracted position.

13. The vehicle door system as recited in claim 8, wherein the protector gear is in engagement with the linear drive gear as the linear drive gear moves toward the extended position to move the edge protector to the deployed position and the edge protector moves from the deployed position to the stowed position upon movement of the linear drive gear from the extended positon toward the retraced position.

14. The vehicle door system as recited in claim 8, wherein the closer includes a closer link driven by the closer gear, the closer link converting rotation of the closer gear into linear movement.

15. The vehicle door system as recited in claim 8, wherein the linear drive gear is driven by a lead screw that drives the linear driver gear along the linear axis.

\* \* \* \* \*